United States Patent
Bromley

(10) Patent No.: US 8,505,931 B2
(45) Date of Patent: Aug. 13, 2013

(54) SLED

(75) Inventor: Kristan Lee Bromley, Sheffield (GB)

(73) Assignee: Bromley Technologies, Ltd. (GB)

(*) Notice: Subject to any disclaimer, the term of this patent is extended or adjusted under 35 U.S.C. 154(b) by 0 days.

(21) Appl. No.: 13/496,850

(22) PCT Filed: Sep. 20, 2010

(86) PCT No.: PCT/GB2010/051569
§ 371 (c)(1),
(2), (4) Date: Jun. 21, 2012

(87) PCT Pub. No.: WO2011/033314
PCT Pub. Date: Mar. 24, 2011

(65) Prior Publication Data
US 2012/0299256 A1    Nov. 29, 2012

(30) Foreign Application Priority Data
Sep. 18, 2009   (GB) .................................. 0916479.9

(51) Int. Cl.
*B62B 13/00* (2006.01)
(52) U.S. Cl.
USPC .............................................. 280/15; 280/18
(58) Field of Classification Search
USPC ................ 280/15, 16, 18, 18.1, 20, 21.1, 22,
280/23.1, 28.11, 606, 87.041; 16/DIG. 13;
441/65, 74, 77, 79; 224/25; D12/6, 11–14
See application file for complete search history.

(56) References Cited

U.S. PATENT DOCUMENTS

| | | | |
|---|---|---|---|
| 3,199,887 A | 8/1965 | McKelvey | |
| 4,326,725 A | 4/1982 | Lagervall | |
| 4,603,870 A * | 8/1986 | Monreal | ........................ 280/18 |
| D316,234 S * | 4/1991 | Mirisch, Sr. | ................... D12/11 |
| 5,273,470 A | 12/1993 | Sneddon | |
| 7,083,173 B2 * | 8/2006 | Lehr et al. | ................. 280/28.16 |
| 7,100,927 B2 * | 9/2006 | Krent | .............................. 280/16 |
| 2003/0205872 A1 | 11/2003 | Mehrmann | |
| 2004/0113378 A1 | 6/2004 | Way | |
| 2005/0212230 A1 | 9/2005 | Krent | |
| 2008/0012251 A1 * | 1/2008 | Luhr et al. | ...................... 280/16 |

FOREIGN PATENT DOCUMENTS

| | | |
|---|---|---|
| DE | 3338363 | 5/1985 |
| DE | 29916601 | 3/2001 |
| DE | 202006010502 | 11/2006 |
| FR | 2707580 | 6/1993 |
| GB | 1004487 | 9/1965 |

OTHER PUBLICATIONS

Wochinz, Reinmar "International Search Report and Written Opinion" International Application No. PCT/GB2010/051569, World Intellectual Patent Organization; Jan. 24, 2011.
Gardiner, Peter "Search Report" Application No. GB0916479.9, Great Britain Intellectual Property Office, Nov. 9, 2009.

* cited by examiner

*Primary Examiner* — John Walters
*Assistant Examiner* — James Triggs
(74) *Attorney, Agent, or Firm* — Nicholas J. Landau; Bradley Arant Boult Cummings LLP

(57) ABSTRACT

A sled for enabling a rider to slide under gravity on snow, the sled comprising: a chassis board of at least partial dish-like form; a chest support structure shaped so as to lift a chest of a sled rider clear of the chassis board; a forward grip arrangement; first and second side handles behind the forward grip arrangement; and at least one blade running fore-aft along a portion of the underside of the chassis board.

20 Claims, 9 Drawing Sheets

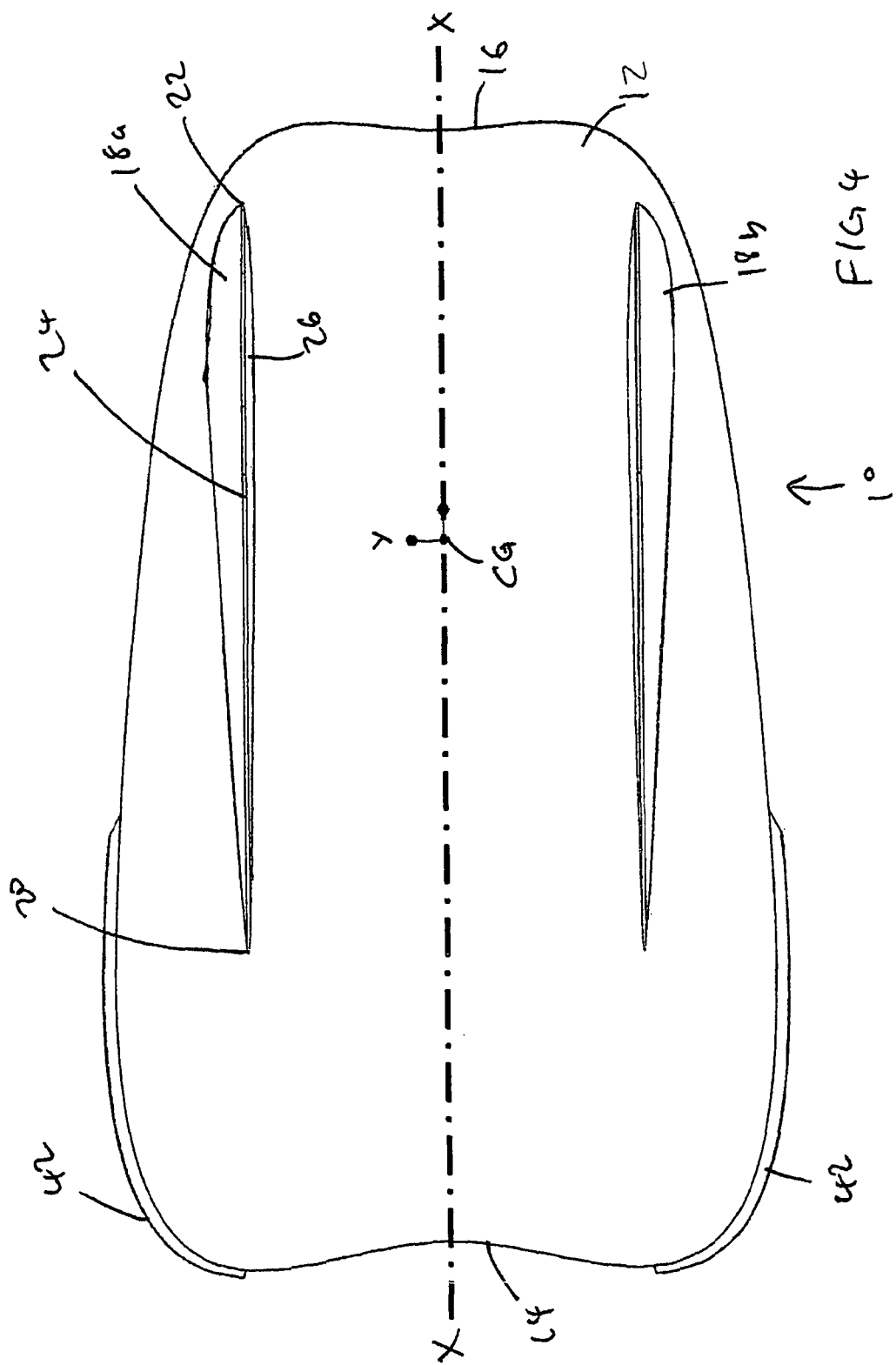

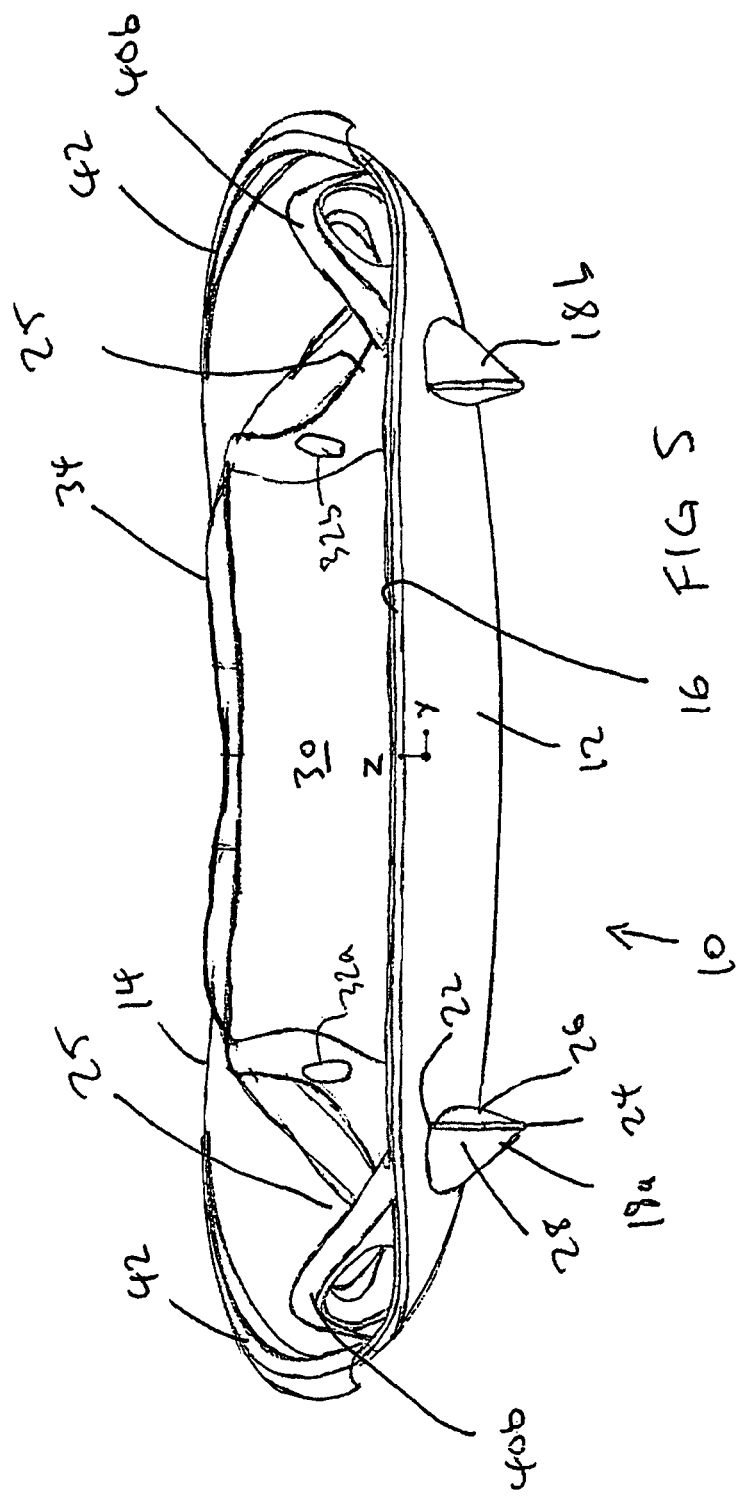

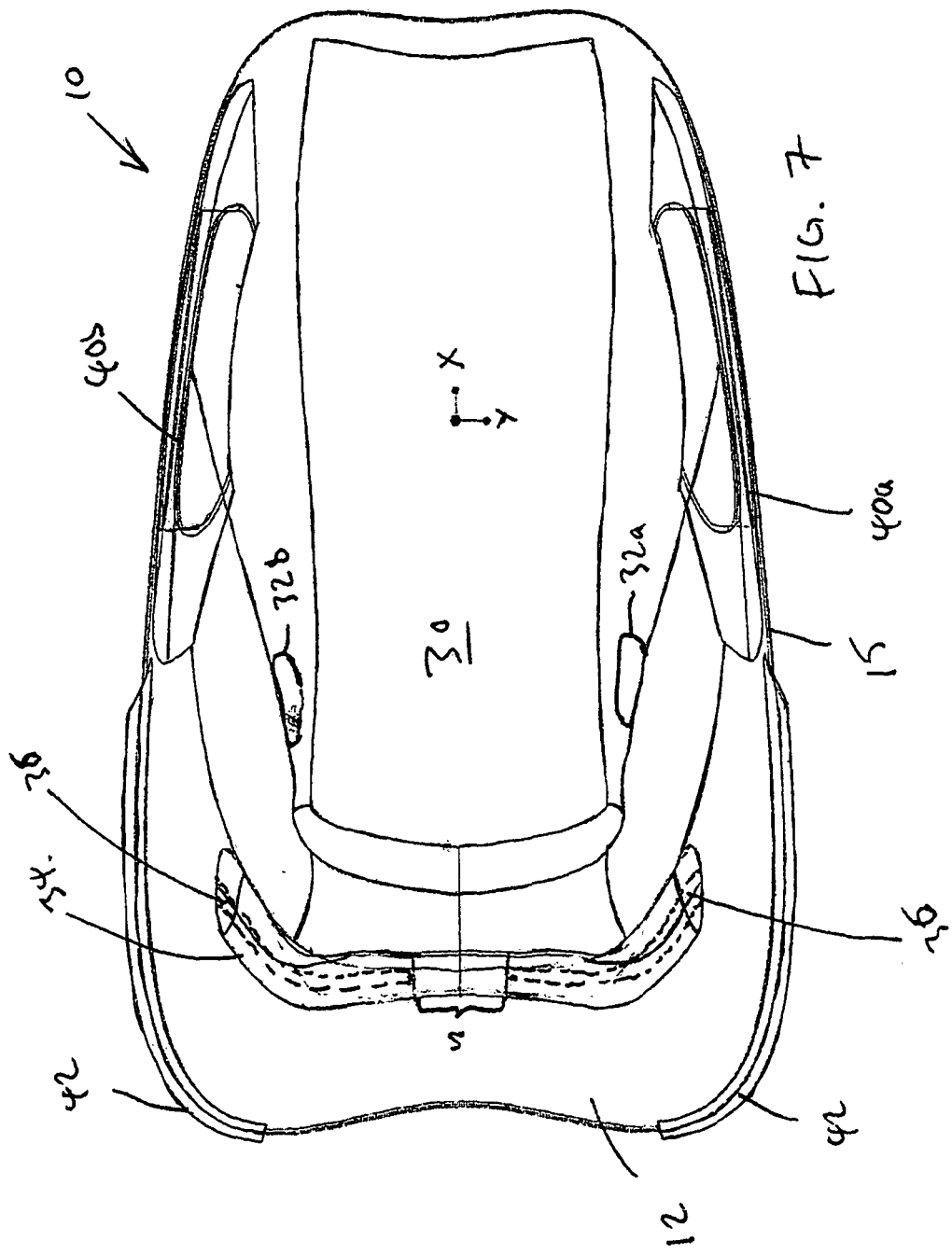

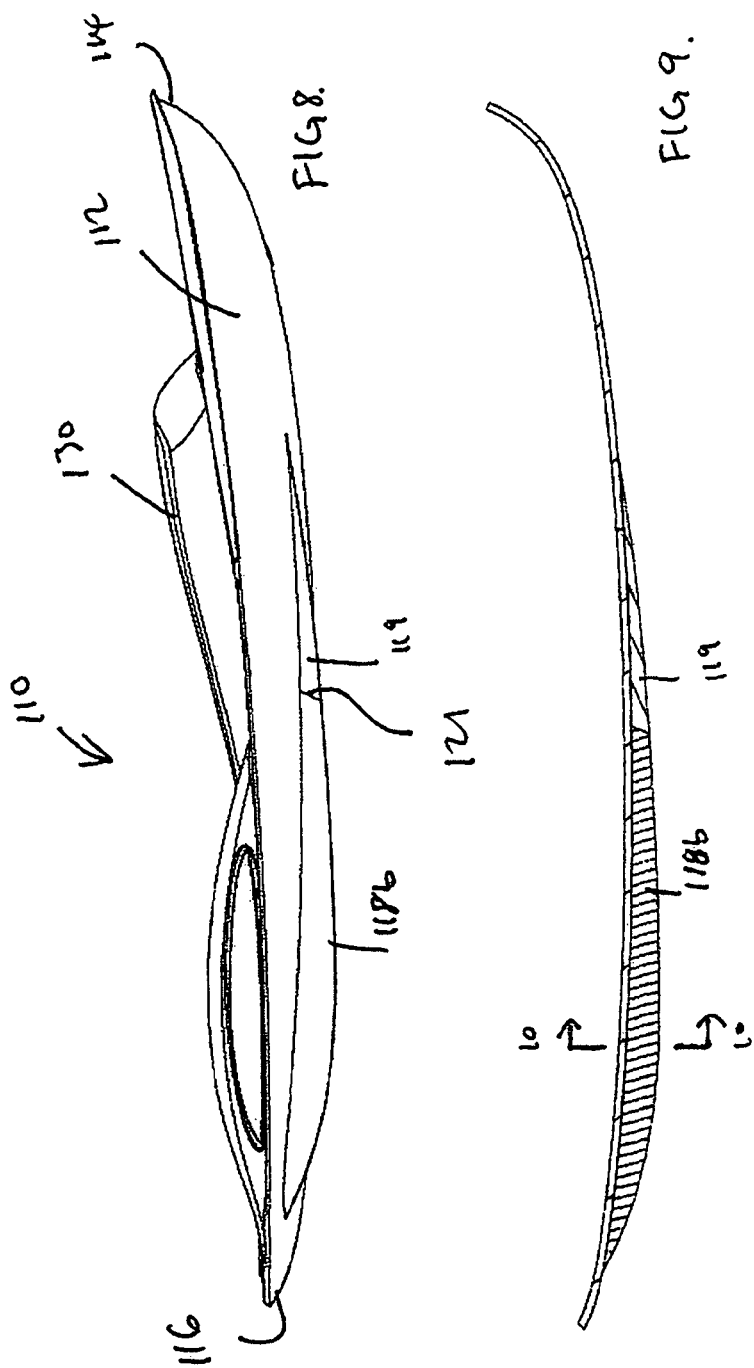

SLED

The present invention relates to a sled. More particularly, but not exclusively, the present invention relates to a sled enabling a human rider to slide down a piste, typically under the influence of gravity.

Sleds, sledges, bobs, and toboggans are well known. Hitherto, there has been a large market for sleds and toboggans used by primarily by children. One known sled is a traditional wooden type comprising a raised platform and distinct runners either side of the platform to raise it above the level of the snow. A user of the sled typically sits upright on the platform with their legs positioned either side.

More recently, substantially one-piece thermoformed plastics sleds have become popular. Typically, these sleds have two or more runners integrally formed in the plastics and the user typically sits upright but with their feet extended forwards. Such sleds are intended for use on snow pistes of the type typically used by skiers and snowboarders.

At the competitive end of the sport is currently bobsledding, luge and skeleton bob, where athletes follow a predetermined downhill track formed with banked curves (typically of concrete) and surfaced with ice rather than snow. Runs are timed, rather than being head-to-head. Thus, there is no scope for rider interaction or choice of route.

The applicant has noted that significant growth in the board sports market has been achieved in recent years, particularly in respect of snowboarding within the winter sports sector. This sector is considered fashionable by young adults in particular, and the sport has spawned a variety of "extreme" competitions that are popular spectator and televised events. Competitors use are highly engineered boards and bindings in such events.

By contrast, in sled based sports there has been popularity for inflatable inner tube type "snowtubes" that are used on downhill runs at many ski resorts. However, such tubes lack any form of control and are primarily targeted at the child market.

Hitherto, there has been no successful high performance piste-based sled that meets the requirements of serious athletes and "extreme" sports enthusiasts, and which may lead to a filtering down to more casual participants. The applicant believes this has held back the development of sled based sports both as a spectator sport and for participants.

The present invention seeks to overcome, or at least mitigate, the problems of the prior art.

Accordingly, one aspect of the present invention provides a sled for enabling a rider to slide under gravity on snow, the sled comprising:
 a chassis board of at least partial dish-like form;
 a chest support structure shaped so as to lift a chest of a sled rider clear of the chassis board;
 a forward grip arrangement;
 first and second side handles behind the forward grip arrangement; and
 at least one blade running fore-aft along a portion of the underside of the chassis board.

Such a sled advantageously provides a greater level of control than prior art sleds Preferably, the sled has a centre of gravity of the sled is located rearwardly of a midpoint of the board in the fore-aft direction and/or the blade extends rearwardly of a centre of gravity of the sled, further enhancing its controllability.

Advantageously the blade widens generally towards the rear or aft portion thereof, and/or the blade generally deepens towards the rear or aft thereof to improve its progressive penetration into the snow under forward motion.

The blade may be releasably securable to the board or integrally formed in the board.

The sled may include two blades, the blades preferably being a mirror image about an XZ plane extending along the centre line of the sled.

The board advantageously has a predetermined amount of flexibility to assist with steering.

The forward grip arrangement may comprise a handle extending generally transversely and preferably a central portion of the handle is flexible in order to allow the board to flex The forward grip arrangement is optionally located generally forward of the support structure or is provided integrally within the support.

Preferably the support structure and the board define a trough on each side of the support structure to receive the rider's arms.

Advantageously the support structure is ramp or wedge shaped with the deepest portion thereof being positioned forwards in order to lift the rider's head clear of the board and the snow and to improve their forward visibility.

The support structure is preferably resilient and more preferably is formed from foam, even more preferably dual density foam.

The first and second side handles are advantageously positioned towards the rear of the sled to provide an improved turning moment when grasped to turn the sled.

The sled is preferably configured such that, in use, a rider's head is positioned substantially rearward of a forward end of the sled.

A second aspect of the present invention provides a sled for enabling a rider to slide under gravity on snow, the sled comprising:
 a chassis board of at least partial dish-like form;
 a chest support structure shaped so as to lift a chest of a sled rider clear of the chassis board;
 a grip arrangement; and
 at least one blade running fore-aft along a portion of the underside of the chassis board.

Embodiments of the present invention will now be described, by way of example only, with reference to the accompanying drawings, in which:

FIG. 4 is a plan view of the underside of the sled of FIG. 1;

FIG. 5 is a rear view of the sled of FIG. 1;

FIG. 6 is a further rear view of the sled of FIG. 1 from a higher view point; and FIG. 7 is a plan view of the top of the sled of FIG. 1.

FIG. 8 is a side view of a sled according to another embodiment of the present invention;

Figure 1:
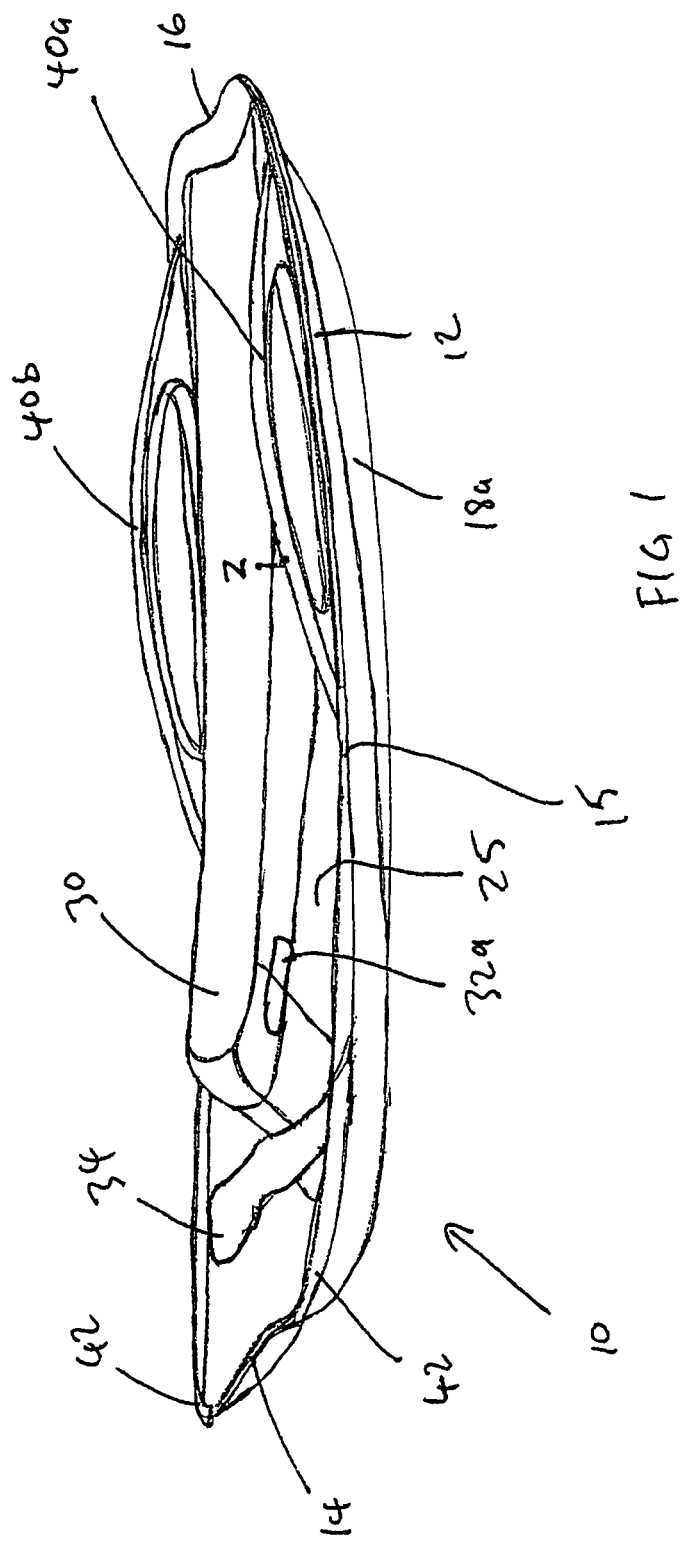
FIG. 1 is an isometric view of a sled according to one embodiment of the present invention.

With reference to FIG. 1, a sled according to an embodiment of the present invention is indicated generally at 10 and comprises a chassis board 12. The board 12 is generally a trapezium in plan view, but with rounded corners and recesses on its front 14 and rear 16 edges. The front edge 14, facing the intended direction of travel is wider than the rear. Additionally, the board 12 is generally dish-shaped with an upturned lip 15 extending around its entire periphery. The depth of the lip is greater towards the front of the sled 10, to prevent the sled "diving" or biting into the snow.

The chassis board 12 provides the inherent strength of the sled 10 and is preferably manufactured from a composite material such as a glass fibre, carbon fibre laminate or sandwich laminate structures of multiple materials, the choice of material being dependent upon the price-point of the sled, desired weight and durability requirements. Such material provides the required amount of strength but a certain amount of flex, which is important for controlling the sled 10. In certain embodiments, a void may be provided between the skins of the sandwich construction.

Figure 3:
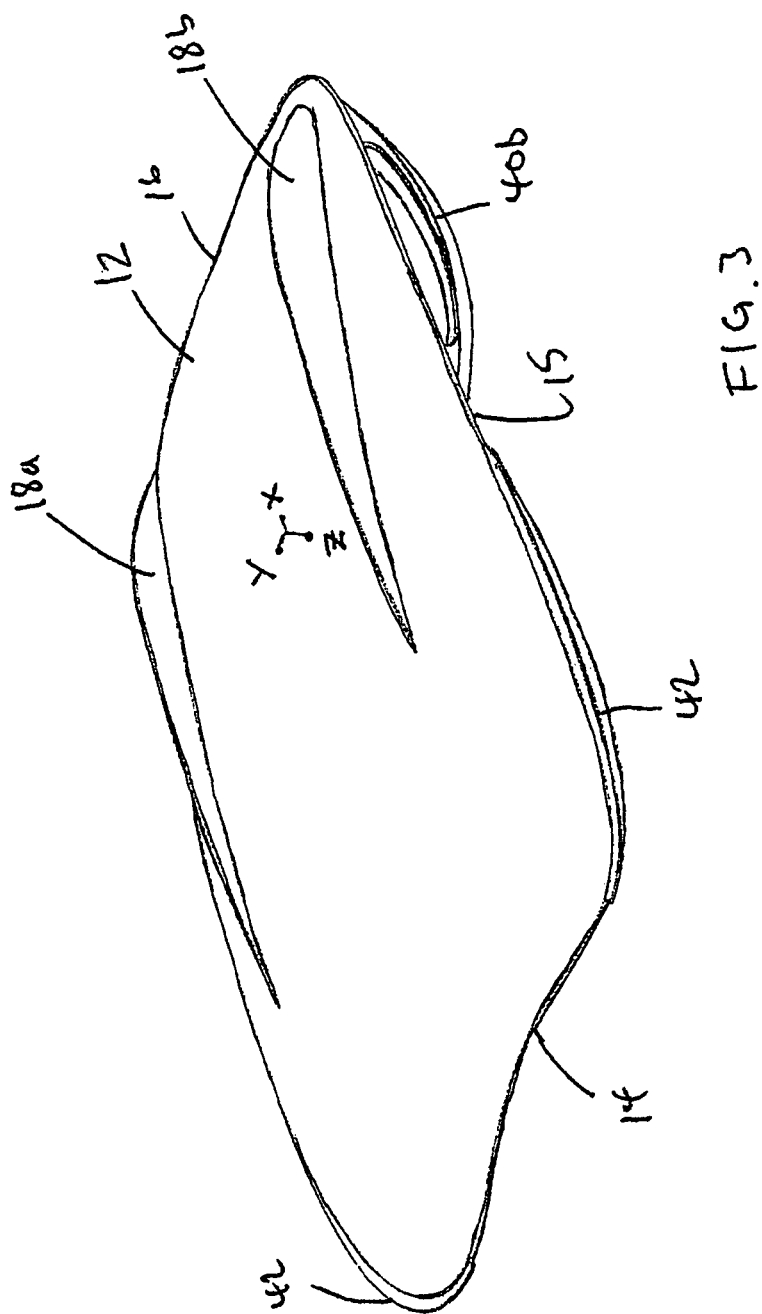
FIG. 3 is an isometric view of the underside of the sled of FIG. 1.

With reference to FIGS. 3, 4 and 5, in this embodiment the sled comprises two blades or runners 18a and 18b that are mutually parallel, parallel to the intended direction of travel and spaced equidistantly from axis X-X of the sled 10 extending fore-aft. In this embodiment, the blades 18a and 18b are tapered in a generally elongate teardrop shape. With reference to blade 18a, this comprises a fore end tip 20 that merges into the chassis board 12 and is positioned approximately one quarter of the distance from fore to aft along the underside of the board 12. From this tip 20, the blade becomes deeper along the (vertical) Z axis, and wider along the Y (inboard-outboard) axis. The blade reaches its widest point close to the aft end of the sled 10 and then tapers rapidly to an aft tip 22. With reference to FIG. 5 in conjunction with FIG. 4, it can be seen that the edge 24 of the blade extends linearly between the fore tip 20 and aft tip 22 and that an inboard face 26 of the blade is, in this embodiment, at a substantially more acute angle with respect to the Z axis than on outboard face 28 of the blade 18a. The second blade 18b is a substantial mirror image of the first blade 18a about an XZ plane defined by the X and Z axes.

It will be appreciated that the blades may be manufactured from a variety of materials, dependent upon the requirements of weight, and durability and the desired cost of the sled. Consequently, the blades may be manufactured from, for example, titanium, aircraft grade aluminium, stainless steel or engineering plastics such as high molecular weight polyethylene, nylon or ABS.

Each blade 18a and 18b is preferably provided with an integral fastener such as a threaded shank that extends into corresponding holes (not shown) in the board 12 for securement thereto. In other embodiments, part of each fastener may be integrally formed in the board. The fasteners are preferably releasable, in order that the blades can be easily removed and replaced.

In particular, it is desirable to produce different blade profiles for different snow conditions. The blades shown in FIGS. 4 and 5 are designed for harder packed snow in view of their relatively sharp edge. In addition, the relatively acute angle for face 26 enables that face of the blade to bite into the snow and enable sharper turns to be achieved, as discussed in more detail below. In other embodiments, shallower blade profiles may be provided, as may ones in which each face is angled equally, or the outboard face 28 is more acutely angled that the inboard face 26. In addition, the blades 18a 18b may have a straight instead of an elongate "teardrop" shape in plan.

It is anticipated that in normal use in normal snow that both the underside of the board 12 and the blades 18a, 18b are in contact with the snow. This may not always be the case if the snow is highly compacted, or has a layer of ice on its surface; in such conditions, it is possible only the blades are in contact.

Referring back to FIG. 4, it can be seen that the centre of gravity of the board 10 as a whole is indicated by point CG. In this embodiment, the midpoint of the blades 18a and 18b in a fore-aft direction is approximately in alignment with the centre of gravity. However, the deepest part of each blade is to the rear of the centre of gravity CG.

Figure 2:
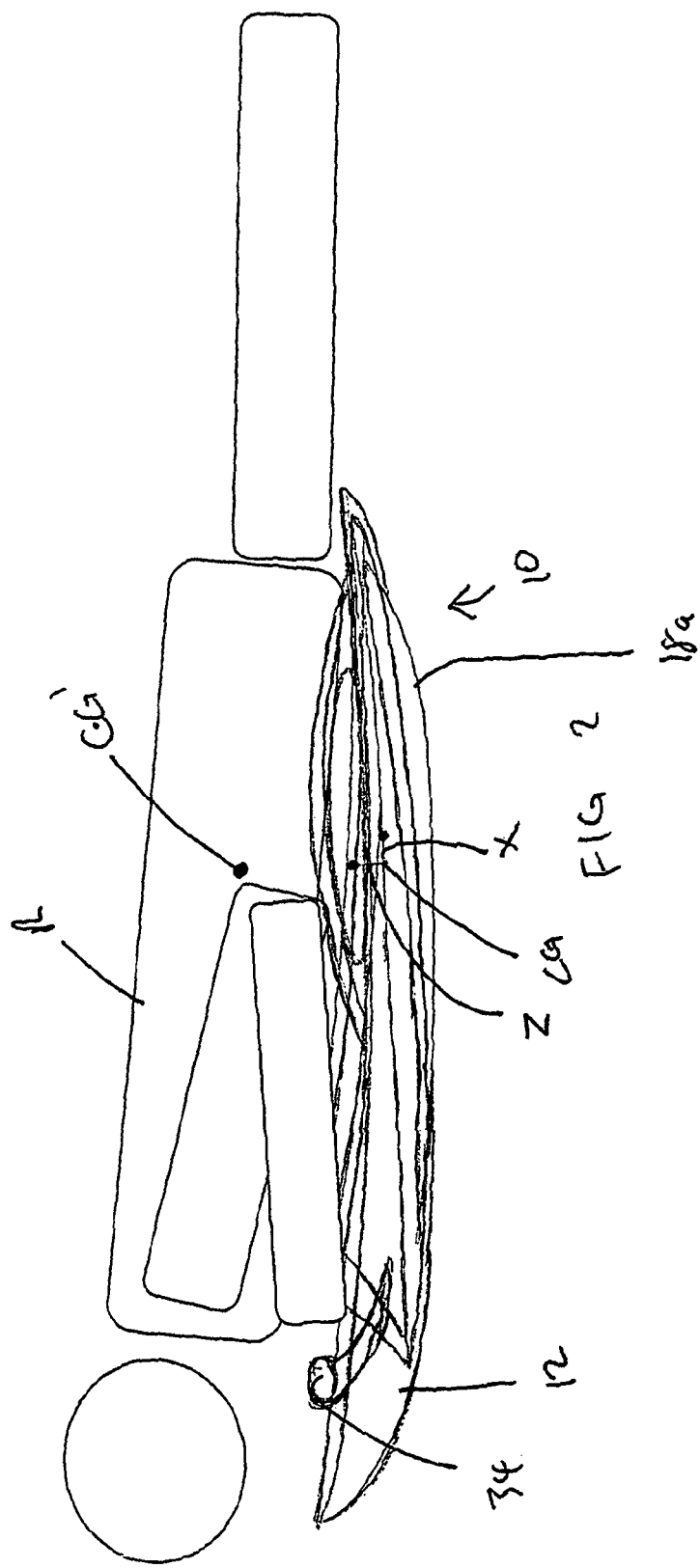
FIG. 2 is a side view of the sled of FIG. 1 with a rider schematically illustrated thereon.

With reference to FIG. 2, which illustrates a rider R of the sled 10 positioned schematically on the sled, it can be seen that the centre of gravity of the rider CG' is also substantially in alignment with the centre of gravity CG of the board 10. Thus, the position of the blades 18a and 18b with respect to the board and the rider enable the rider to shift their weight forward slightly if they do not wish the blades to cut so much into the snow in order to increase the sled's speed at the cost of a degree of control. However, to achieve a greater degree of control, they may shift their weight rearward slightly in order that the blades bite more deeply into the snow.

Although this layout of blades with respect to the board is currently preferred, it is anticipated that significant variations in blade position and shape may be provided so that, for novice riders the board may be more easily controllable and steerable, at the expense of greater speeds. For this to be achieved, a greater depth of blade may be provided further forward on the board and the fore tip of the blade may be provided further forward on the board.

In addition, a greater or lesser number of blades, e.g. 1, 3, 4, or 5, may be provided on the board and the shapes of the blade may be altered.

With reference to FIGS. 1, 6 and 7, it can be seen that an upper face of the board is provided with a wedge shaped support or saddle 30.

The support 30 is preferably formed from a foam which deepens towards the front of the sled 10, as well as narrowing somewhat towards the front of the sled. The support 30 is configured to support the rider's chest and abdomen and to raise their chest and head to a position at which the head is clear of the front of the sled 10 and of the snow. In this position the rider is in a safer position and one in which he/she is able to have better forward visibility. It will be appreciated that the recess on the front edge of the board 12 also provides further clearance between the rider's head and the board. As can be seen from FIG. 2, the rider's head is positioned substantially rearward of the front edge 14 of the board for additional safety.

As well as altering the rider's position, the support 30 includes padding which provides for a more comfortable ride, particularly over uneven snow. To this end it is preferred that the padding is formed from dual density foam such that it is relatively forgiving up to a certain level of compression and then provides more rigid support above a predetermined threshold. The foam is preferably covered with a harder wearing fabric, leather or pseudo-leather covering, or an integral skin formed from treating the foam padding material. In alternative embodiments, the support may be made up of multiple pieces and/or may be hollow.

In a preferred embodiment of the invention, the support is provided with first and second side recesses 32a and 32b that are integrally formed in the foam. This provides a location for gripping the sled if the rider dives onto the sled from a running start, and may also be used for steering, as discussed in more detail below.

The support 30, together with the lip 15 of the board 12 define troughs 25 either side of the support for the rider to position their arms in use.

A further grip is provided by a transverse forward handle 34 that when viewed from above the sled 10 has an elongated m-shaped profile.

The forward handle 34 is preferably secured to the board 12 using fasteners such as bolts, which bolts may be embedded within the laminate layers of the composite material. In this embodiment, the forward handle 34 comprises rigid plastics or metal inners 36—illustrated by broken lines in FIG. 7 that extend from each attachment point of the handle to the board 10 towards the centre point of the handle, which centre point lies in alignment with the X axis of the board. However, the inners 36 do not meet leaving a spacing S therebetween. The forward handle inners 36 are over-moulded with a more flexible, compliant material that bridges the spacing S and makes a handle 34 more comfortable to grasp. The handle may alternatively be formed from aluminium tube only. The handle may also be formed as a single piece without the central spacing.

The handle 34 is intended to have multiple uses. It is a carrying handle for transport, is used by the rider to provide a sure grip on the sled 10, and is also used for steering.

It is for this latter reason that the inners 36 do not extend along the length of the handle 34. Steering is aided by a degree of flex in the board 12 itself, and this flex would be restricted if the handle 34 were to be entirely rigid. The spacing S by contrast enables a certain amount of flexure and translation to occur between the ends of the handle, so that flexure of the board 12 can also occur.

The upper face of the board additionally has first and second side handles 40a and 40b secured proximate the rear and each side edge thereof. Again, the handles are secured to the board 12 using suitable fasteners and are preferably manufactured from a suitable engineering plastics material such as high molecular weight polyethylene. These handles 40a and 40b may also be used for transportation, as well as for steering of the sled 10. The handles 40a and 40b are additionally contoured, as can be seen most clearly in FIG. 5 to assist in providing lateral restraint to the rider R when lying upon the support 30. In alternative embodiments the handles 40a and 40b may be formed integrally as part of the board 12.

The peripheral lip 15 of the board 12 is additionally provided with a bumper/rubbing strip 42 again formed from a suitably hard-wearing plastics material. In the embodiment illustrated two such strips 42 are provided at front corners of the board 12 extending rearwards and terminating proximate the forward edge of the side handles 40a and 40b. The bumpers may be secured to the lip 15 using adhesive or suitable fasteners (to enable them to be replaced). The bumpers 42 are designed to protect the sled 10 against sled to sled contact or ice/snow to sled contact (from impacts with chunks of ice on the piste) or sled to foreign objects. In alternative embodiments, such a strip could extend around the entire peripheral lip of the board, thereby increasing its durability and negating the need to finish the lip, but at the expense of increased weight.

Finally, the board may be provided with one or more transponders/tags (not shown) that are preferably embedded within the composite material of the board during its manufacture and which can be used for timing runs and/or logging the usage of sleds, for example if they are hired out on a per use basis.

In use, the sled 10 may be ridden as a conventional sled is ridden—i.e. from a standing start at the top of a snow covered slope and simply be ridden down under the influence of gravity. The rider may use their feet, which as can be seen in FIG. 2 extend rearwardly beyond the rear 16 edge of the sled as a brake or for additional steering influence.

However, in an preferred usage of the sled 10, it is anticipated that sloped pistes will be prepared using piste preparation equipment known for use in preparing runs for snowboards to prepare runs comprising a mixture of berms, jumps and toboggan run-like banked curves that are however formed solely from snow. Riders may use sled 10 to ride such pistes either to perform stunts, follow a pre-determined, or freely chosen, route against the clock, or to race head-to-head with other participants. The sleds may be used in a running start.

By shifting their weight around the sled 10, grasping various combinations of the handles, leaning and contacting the snow with one or other of their feet, the rider is able to control the direction of movement and speed of the sled of the present invention to a much greater extent than with conventional sledges.

Specifically, in order to undertake a shallow left hand turn, the rider may simply shift their weight to the left of the sled. To undertake a sharper left hand turn, the rider grips a right hand side of the forward handle 34 and the left hand side handle 40a and pull upwardly on the forward handle. This changes the angle of attack of the left hand blade 18a due to flexure of the board, and a resultant force moment about the centre of gravity CG, resulting in the turn. For a tighter turn still, the rider may plant their left hand foot into the snow in order to increase the drag on the left hand side of the sled. Opposite movements enable right hand turns to be achieved. The side recesses 32a and 32b may be used instead of handle 34.

Figure 9:
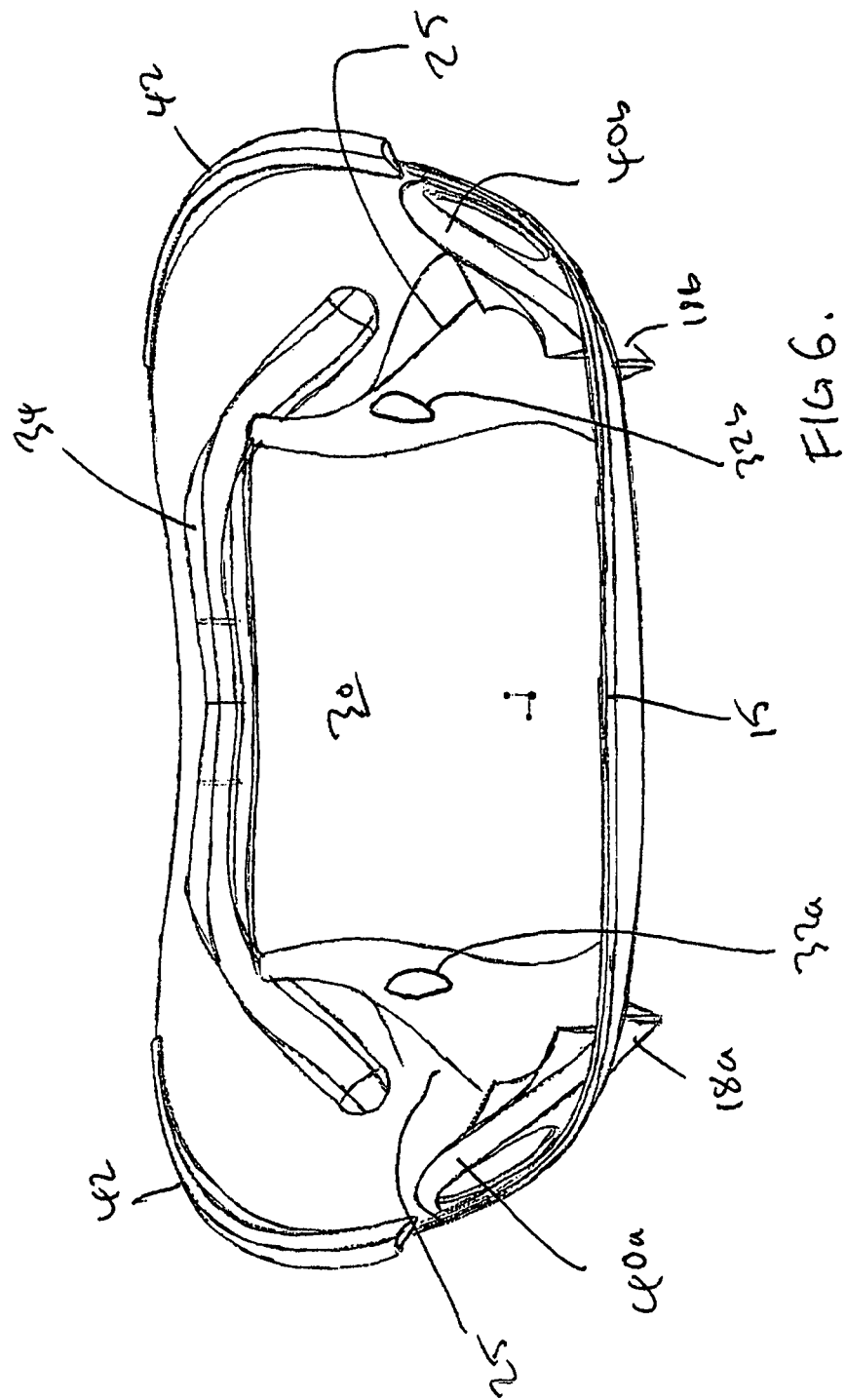
FIG. 9 is a vertical longitudinal cross-section through a blade and chassis of the sled of FIG. 8.

FIGS. 8 and 9 illustrate a second embodiment of the present invention having a differing form of blade. Like components are labelled with like numerals, but with the prefix 1.

In this embodiment, a fore portion 119 of each blade is integrally formed with the chassis 112 from the same material. The aft portion 118b is however a separate interchangeable component in a similar way to the blades 18a and 18b of the first embodiment, as is the corresponding blade on the other side of the chassis (not visible). The connecting surface 121 between the fore 119 and aft 118b portions is angled rearwardly in this embodiment to help retain the rear portion 118b and minimise the risk of the edge becoming pried away by foreign objects during use of the sled. As can be seen from FIG. 10 the blade 118b is however similar to blades 18a and 18b in cross-section, and maybe secured to the chassis 112 using similar fixing methods. In a further variant, the fore portion 119 may be separately attachable to the chassis, to make a two piece blade system.

Figure 10A:
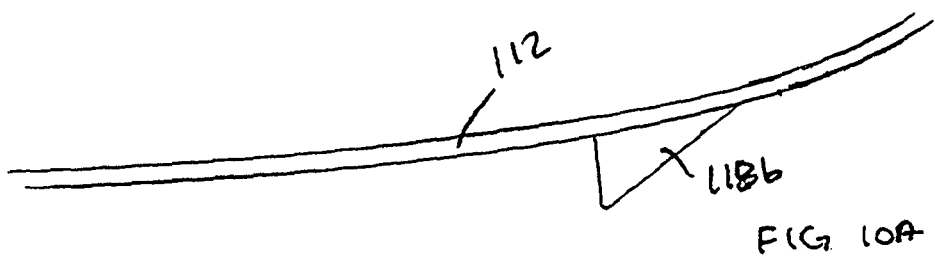
FIGS. 10A to 10D are variant forms of blade seen in transverse cross-section 10-10 of FIG. 9
Figure 10B:
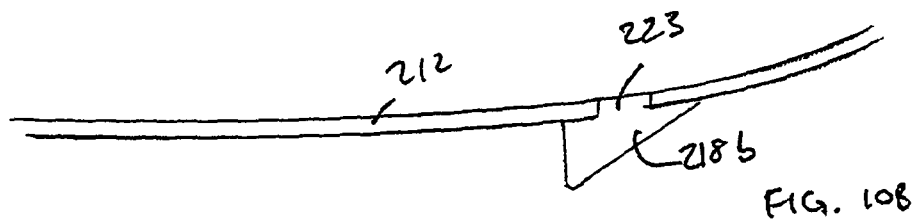
Figure 10C:
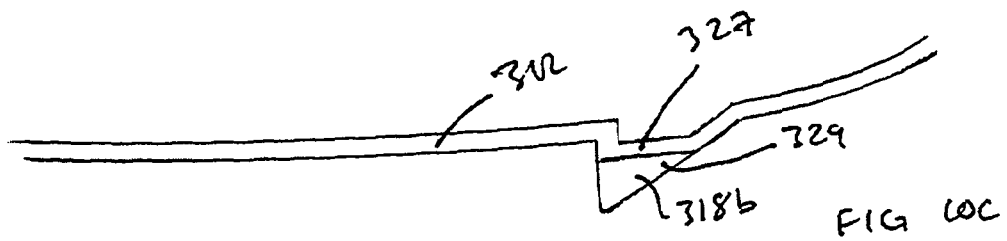
Figure 10D:
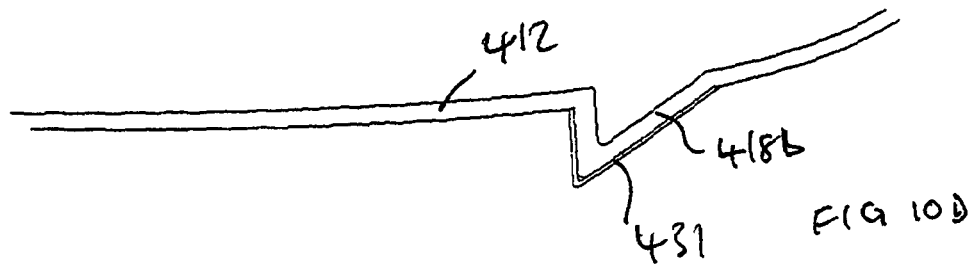

FIGS. 10B, 10C and 10D illustrate further blade variants that may be either a full length blade of the type shown in FIGS. 1 to 7 or a partial portion as shown in FIGS. 8 and 9.

FIG. 10B illustrates a blade 218b with a projection 223 that extends through a corresponding aperture in the chassis 212 where it may be secured by adhesive, or a releasable fastener.

FIG. 10C illustrates a further variant in which an upper section of the blade is formed by adjusting the chassis mould to have an integral rib 327 to which a matching lower section 329 is then secured. In embodiments where a shank (not shown) of the lower section 329 extends through the chassis, the recess formed by the rib 327 may be used to locate a fastener (not shown) or other means of securement.

In FIG. 10D the entire blade profile is formed from the chassis 412, but to prevent the chassis material being worn away where it forms the blade 418b an additional layer of, for example, steel or titanium 431 is permanently or releasably secured to the blade 418b.

It will be readily apparent to the reader that sleds of the type disclosed above provide a more controllable, higher speed "adrenalin sports" type of experience that has hitherto been lacking from traditional sledging and tobogganing activities on snow. In particular, this level of controllability, when used in conjunction with specifically prepared courses provides a sport that gives a significant amount of variety and exhilaration to encourage repeat usage of the sled. The forward facing—chest down position provides good visibility with minimum wind resistance. In addition, the relatively small area required for usage of the sled makes it attractive to spectators, and for televising. Furthermore, the sport may be offered by ski resorts, with sleds rented out on a per use or time basis as an additional revenue generator requiring a limited amount of land use. Finally, it should be noted that a further advantage of this shape of sled is that sleds facing in opposite directions and with the upper faces in contact may be nested together in pairs for ease of transport.

It should be understand that numerous changes may be made within the scope of the present invention. For example, the general shape of the board may be altered, although to impart strength to the board, and prevent it diving into the snow in use, at least the forward facing portions thereof require an upwardly turned lip. Two separate handles may be provided rather than one single forward handle. The recesses in the support may be omitted. The separate forward handle may be omitted and the sled control using recesses in the side of the support, or front thereof. In a basic version of the sled, the blades may be integrally formed in the board or non-removably adhered or attached thereto as may the side handles. In lightweight versions of the sled, the bumpers may be omitted and the support may be integrally formed from the board. The sled may be used on artificial ski slopes with little or no adaptation.

The invention claimed is:

1. A sled for enabling a rider to slide under gravity on snow, the sled comprising:
   a chassis board of at least partial dish-like form;
   a chest support structure that is higher at the front of said structure as compared to the back and central portions so as to lift a chest of a sled rider clear of the chassis board;
   a forward grip arrangement;
   at least one blade running fore-aft along a portion of the underside of the chassis board;
   wherein the chest support structure and the chassis board defines a trough on each side of the support structure to receive the rider's arms.

2. A sled according to claim 1 wherein a centre of gravity of the sled is located rearwardly of a midpoint of the board in the fore-aft direction.

3. A sled according to claim 1 wherein the blade extends rearwardly of a centre of gravity of the sled.

4. A sled according to claim 1 wherein the blade widens generally towards the rear or aft portion thereof.

5. A sled according to claim 1 wherein the blade generally deepens towards the rear or aft thereof.

6. A sled according to claim 1 wherein the blade is releasably securable to the board.

7. A sled according to claim 1 wherein the blade is integrally formed in the board.

8. A sled according to claim 1 comprising two blades, the blades preferably being a mirror image about an XZ plane extending along the centre line of the sled.

9. A sled according to claim 1 wherein the board has a predetermined amount of flexibility.

10. A sled according to claim 1 wherein the forward grip arrangement comprises a handle extending generally transversely.

11. A sled according to claim 10 wherein a central portion of the handle is flexible.

12. A sled according to claim 1 wherein the forward grip arrangement is located generally forward of the support structure.

13. A sled according to claims 1 wherein the grip arrangement is provided integrally within the support.

14. A sled according to claim 1 wherein the support structure is ramp or wedge shaped with the deepest portion thereof being positioned forwards.

15. A sled according to claim 1 wherein the support structure is resilient.

16. A sled according to claim 15 wherein the support structure is formed from foam.

17. A sled according to claim 15 wherein the foam is dual density foam.

18. A sled according to claim 1 further comprising first and second side handles.

19. A sled according to claim 18 wherein the first and second side handles are positioned towards the rear of the sled.

20. A sled according to claim 1 configured such that, in use, a rider's head is positioned substantially rearward of a forward end of the sled.

* * * * *